Aug. 12, 1952 F. WALLER ET AL 2,606,476

METHOD OF SOUND REPRODUCTION ACCOMPANIED BY PICTURES

Original Filed March 31, 1947 3 Sheets-Sheet 1

INVENTORS
Fred Waller
Willis Robert Dresser
BY
Emery, Varney, Whittemore & Dix

Aug. 12, 1952 F. WALLER ET AL 2,606,476

METHOD OF SOUND REPRODUCTION ACCOMPANIED BY PICTURES

Original Filed March 31, 1947 3 Sheets-Sheet 2

INVENTORS
Fred Waller
Willis Robert Dresser
BY
Emery, Varney,
Whittemore & Dix

METHOD OF SOUND REPRODUCTION ACCOMPANIED BY PICTURES

Original Filed March 31, 1947 3 Sheets-Sheet 3

INVENTORS
Fred Waller
Willis Robert Dresser
By. Emery, Varney, Whittemore & Dix.

Patented Aug. 12, 1952 2,606,476

UNITED STATES PATENT OFFICE 2,606,476

METHOD OF SOUND REPRODUCTION ACCOMPANIED BY PICTURES

Fred Waller, Huntington, N. Y., and Willis Robert Dresser, Long Hill, Conn., assignors to The Vitarama Corporation, Huntington Station, N. Y., a corporation of New York Original application March 31, 1947, Serial No. 738,404, now Patent No. 2,475,439, dated July 5, 1949. Divided and this application July 2, 1949, Serial No. 102,792

9 Claims. (Cl. 88—16.2)

Figure 1:
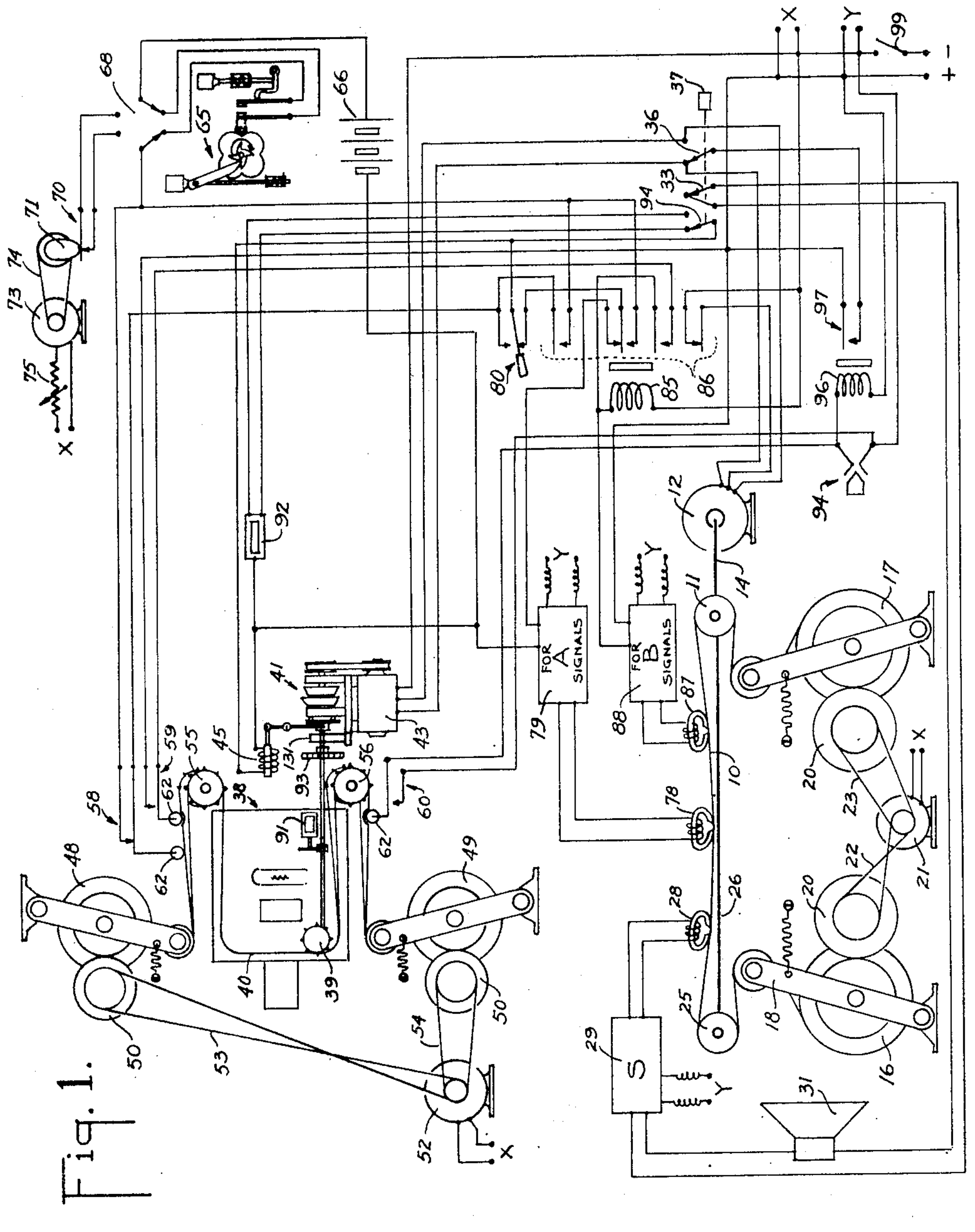

This invention relates to apparatus for coordinating sound reproductions with displays that are exhibited in accordance with a predetermined sequence.

One object of the invention is to provide an improved method for coordinating sound reproduction and display exhibitions so as to obtain more flexible control of both the sound and displays, while at the same time maintaining them in the timed relation necessary to have the intended discourses of the sound reproduction accompany the exhibition of particular displays or groups of displays. This flexibility permits the stopping of the sound record during certain periods while the displays are exhibited, and the holding of a selected display on exhibit for longer or shorter times, as desired.

The method includes also the reversing or rewinding and repeating of selected parts of the sound and display sequences, a feature particularly useful with educational programs, when some of the students do not fully understand an explanation or illustration the first time that it is presented to them.

The displays referred to in connection with this invention are ordinarily images on motion picture film, but may be lantern slides connected together in sequence by link mechanism, or may be actual physical displays connected in any desired way for successive movement into position for exhibition.

The sound that accompanies the exhibition of the displays is reproduced from a record that may be a disc, a magnetic wire, a strip having magnetic or light controlling signals, or any other known type of sound record.

The record is made with pauses, as for punctuation, and with control signals at such pauses so that the record can be stopped or started in accordance with these control signals to prevent a cutting off or starting at inappropriate places on the sound track. The sections of the sound track of the record between such pauses are referred to in the description of this invention as "discourses." This term "discourses" is used in a broad sense, however, to cover music or other sounds, as well as speech, though for the purposes for which the invention is primarily intended, the discourses are ordinarily speech or at least partially speech.

Another object of the invention is to provide apparatus for exhibiting displays in a predetermined sequence with sound accompaniment, but with provision for intermittent operation for the sound record, without losing the coordination of the display sequence and the sound. Signals on the sound record are used to control the movement of successive displays into position for exhibition when the sound record is running, and the movement of the displays is used to control the restarting of the record at the proper time after the record has been stopped.

Another object is to provide apparatus for reproducing sound and exhibiting displays in sequence and in timed relation with the sound under fully automatic control, but with provision for intervening manual control by which an operator or instructor can increase the time between successive displays or shorten the time, as desired, or cause sections of the record and display sequence to be repeated at will. The apparatus includes combinations for synchronizing the record and display sequence at regions where synchronizing is necessary.

When using motion picture film, the flexibility of this invention makes it possible for the instructor to hold any selected image on the screen as long as he wants it, or to change images in rapid succession to obtain a moving picture, and to repeat both the still and moving picture, if desired.

One feature of the invention relates to means for restoring the synchronism or coordination of the record and display sequence if for any reason they do get out of the desired timed relation. A counter responsive to display-change signals, and another counter responsive to actual display changes is one of the combinations used for restoring synchronism. Another expedient is the location of corresponding numbers or other indicia on corresponding regions of the record and displays.

This application is a division of the co-pending application Serial No. 738,404, filed March 31, 1947, now Patent No. 2,475,439, issued July 5, 1949.

Other objects, features and advantages of the invention will appear or be pointed out as the description proceeds.

Figure 2:
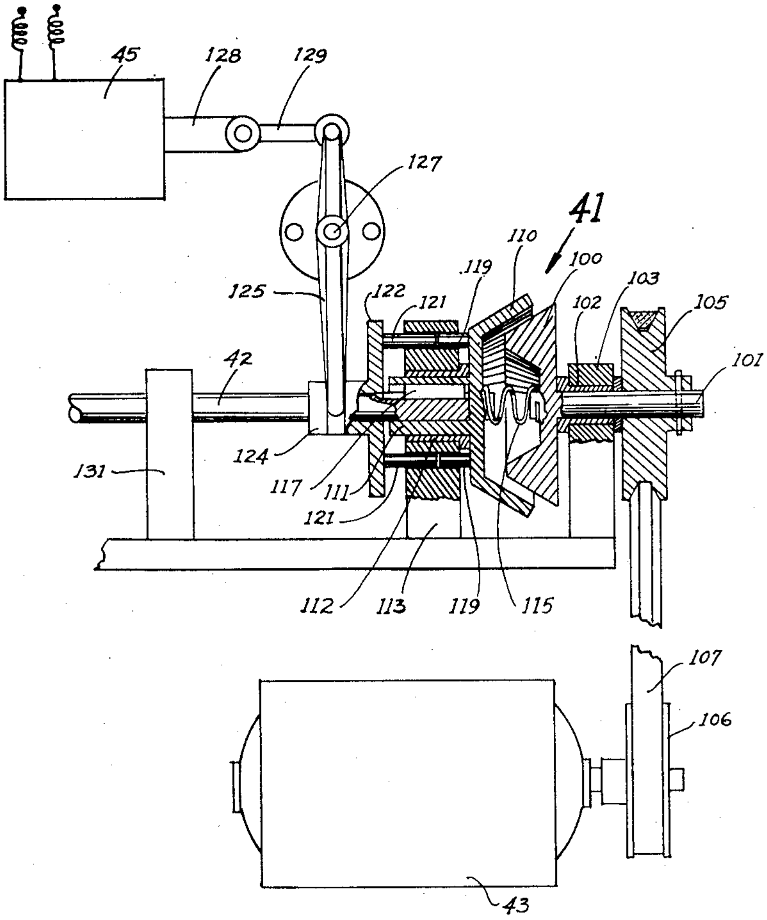
Figure 5:
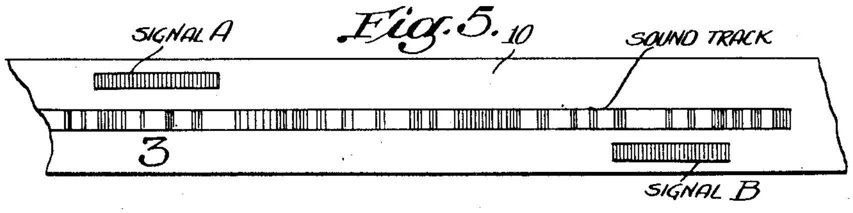
Figure 3:
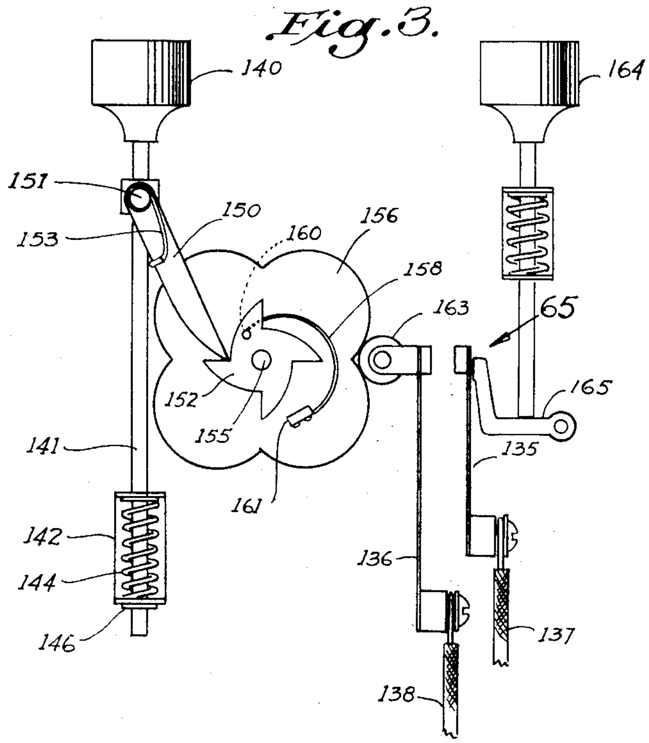
Figure 4:
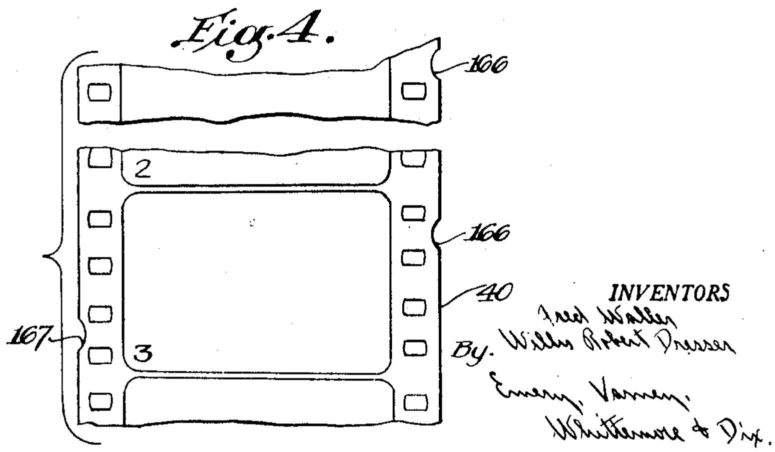

In the drawing, forming a part hereof, in which like reference characters indicate corresponding parts in all the views:

Figure 1 is a diagrammatic view showing apparatus for reproducing sound and controlling the exhibition of displays in accordance with this invention, Figure 2 is an enlarged detail view, partly in section, showing the clutch mechanism used in the combination illustrated in Figure 1, Figure 3 is an enlarged detail view of one of the manual control switches shown in Figure 1, Figure 4 is an enlarged fragmentary view of a section of moving picture film that is used with the apparatus of Figure 1, Figure 5 is a view showing a portion of the record used for sound reproduction and for the control of the displays sequence.

The apparatus includes a sound record 10 which is shown as a strip on which magnetic signals are recorded. The record 10 passes over a driving roller 11 connected with a reversible electric motor 12 by motion transmitting connections illustrated diagrammatically by the shaft 14. The record 10 winds on reels 16 and 17 supported on movable spring-tensioned frames 18 and 19 in such a way as to take up the slack in the record strip. There are slack take-up drives 20 for each of the reels 16 and 17; and these slack take-up drives are operated by an electric motor 21 through belts 22 and 23, or other driving connections.

There is another driving roller 25 over which the record 10 passes at a substantial distance from the first driving roller 11, and the recording or reproducing apparatus for the sound and control signals is located along the portion of the record 10 between the spaced rollers 11 and 25. The roller 25 is driven from the roller 11 by a shaft 26. The sound recording or reproduction is obtained from an electro-magnetic device 28 which is responsive to electric impulses for recording on the record and to magnetic variations in the sound track on the record 10 for reproducing the recorded sound. This device 28 is connected with an amplifying unit 29 which operates an audio-responsive apparatus 31. For recording, the apparatus 31 is a transmitter, and for reproducing sound the apparatus 31 is a speaker, or group of speakers. The apparatus will be described as used for sound reproduction.

One side of the circuit connecting the amplifier unit 29 with the speaker 31 passes through a switch 33 that is used for opening the speaker circuit 31 when the sound track is moving backwards. This prevents the speaker 31 from operating when the record 10 is not moving in the direction that produces intelligible sound.

It is a feature of the invention that the record 10 can be operated in a reverse direction in order to repeat portions of the discourse or to repeat control signals for changing the exhibition of any of the displays. Reverse operation of the sound record is accomplished by reversing the motor 12. The motor 12 is reversed by a double throw switch 36 operated by a manual control 37. The switches 33 and 36 are mechanically connected as indicated by the dotted line in Figure 1, so that the switch 33 is closed only when the reversing switch 36 is in position to cause the sound track to be operated in a forward direction.

The display exhibiting apparatus shown in Figure 1 is a projector 38 with an intermittent movement device 39 for moving a motion picture film 40 one frame at a time in a manner well understood in the art. This device 39 is operated by a one-turn clutch 41 through a drive shaft 42. The driven element of the clutch 41 is connected with the drive shaft 42, and the driving element of the clutch is rotated by an electric motor 43. This motor 43 is reversible, and the motor is reversed by the same switch 36 that reverses the motor 12 which drives the sound record. The clutch 41 is engaged by actuation of a solenoid 45.

A detailed description of the clutch 41 and its operation will be given in connection with the explanation of Figure 2. For an understanding of the operation of the apparatus shown in Figure 1, it is sufficient to understand that each time the solenoid 45 is energized by a pulse of current, the clutch 41 engages and causes the intermittent movement device 39 to move the film 40 far enough to bring the next frame of the film into position for projection. If the solenoid is energized by a steady flow of current, the clutch 41 remains engaged and the intermittent movement device operates the projector in the conventional manner for showing motion pictures.

The projector 38 has reels 48 and 49 on which the film 40 winds and there are slack take-up mechanisms 50 connected with each of the reels 48 and 49. These slack take-up mechanisms 50 are driven by a motor 52 through belts 53 and 54. The film 40 passes around sprockets 55 and 56 and there are switches 58, 59 and 60, each of which is operated by a feeler 62 located near one or the other of the sprockets 55 and 56 in position to drop into notches in the side of the film 40. These notches are control signals on the film for controlling the operation of the apparatus in response to movement of the film. When the sound record is used without a film, the switch 59 that controls the restarting of the film is operated manually.

The clutch 41 may be controlled manually, for a single change from one picture to the next picture on the film, or to change pictures in rapid succession for motion pictures, by means of a switch 65 in the circuit of the solenoid 45. In the illustrated apparatus, a battery 66 is provided for energizing the solenoid 45, and the switch 65 is connected into the circuit with the battery 66 and the solenoid 45 by a double-pole, double-throw switch 68.

The switch 68 is shown closed in its downward position which makes the manually-operated switch 65 effective to control the operation of the projector 38. The construction of the manually operated switch 65 will be described in connection with Figure 3, and for an understanding of the operation of the apparatus shown in Figure 1 it is sufficient to understand that the manually operated switch 65 has two buttons, one of which is pushed to provide a a momentary surge of current to the solenoid 45 and the other of which supplies a steady flow of current to the solenoid as long as the button is depressed.

Mechanically actuated switching mechanism is provided for supplying the solenoid 45 with periodic power impulses in accordance with a variable timing. This apparatus includes a switch 70 that is normally open and periodically closed by a cam 71. The cam 71 is driven from a motor 73 through pulleys connected by a belt 74. This driving connection between the motor 73 and cam 71 is merely representative of motion transmitting connections through which rotation of the motor 73 can be imparted to the cam 71 with a suitable reduction in speed. The speed of rotation of the motor 73 is adjustable by a variable resistance 75 which is representative of motor speed control apparatus. The switch 70 is connected into the circuit of the solenoid 45 and battery 66 by shifting the double-pole, double-throw switch 68 into its upward position. The shift of the switch 68 from its downward to its upward position substitutes the mechanically actuated switch 70 for the manually actuated switch 65.

An electro-magnetic device 78, located along the run of the record 10 between the rollers 11 and 25, is used for recording or reproducing control signals on the record for causing the solenoid 45 to be energized to change the displays. These signals will be referred to as "A" signals. When using the record for reproduction, the electromagnetic device 78 acts as a pick-up device for converting the magnetic signals on the record 10 into electrical impulses that are amplified in an amplifier unit 79 in which the signals cause a momentary contact switch to close and complete a circuit through the solenoid 45, a pre-selector switch 80, and through one set of contacts of a main control relay 85.

The pre-selector switch 80 has a handle at one end by which it can be moved selectively to close the circuit through either its upper or lower fixed contact. This switch 80 must be closed against its lower contact in order to have the A signals from record 10 control the energizing of the solenoid 45.

The main control relay 85 has five fixed and four movable contacts enclosed in Figure 1 within the brace designated by the reference character 86. When the coil of the relay 85 is not energized, the movable contacts occupy the relative positions shown in Figure 1, but when the coil of this relay 85 is energized, the relay pulls down all of its movable contacts so that the first three of the movable contacts touch the fixed contacts beneath them, and the fourth or lowermost movable contact of the relay is moved into an open circuit position.

The main control relay 85 is actuated by control signals on the record 10 that will be referred to as "B" signals. These B signals are recorded or reproduced by an electro-magnetic device 87 located along the run of the record 10 between the rollers 11 and 25. When the apparatus is being used for reproduction, the electro-magnetic device 87 converts the magnetic B signals on the record 10 into electric impulses that are amplified in an amplifier unit 88. These B signals close a momentary contact switch in the unit 88 to complete the circuit of the operating coil of the main control relay 85.

Only one control impulse from the amplifier 88 is required to pull down the movable contacts of the relay 85 and keep them down, because this relay 85 has a holding circuit which includes the third movable contact of the relay and the switch 59 that is operated by the feeler 62 in contact with the edge of the film 40. The switch 59 is always closed except when a notch signal in the film permits the feeler 62 to move and open switch 59. The third movable contact of the relay 85 is in closed position whenever the coil of this relay 85 is energized. From this description it will be apparent that the relay 85 will remain in its down position with its coil continuously energized until a signal on the film 40 causes the switch 59 to open and break the holding circuit of the relay.

The operator can control the picture or display changes manually, even when the sound record is in operation, by moving the pre-selector switch 80 into its upward position. This opens the circuit of the lower fixed contact of switch 80 and takes the control of the display change away from the amplifier unit 79 regardless of the position of the relay 85.

When the switch 80 is in its downward position, the A signals from the amplifier 79 can effect a change of display if the relay 89 is not energized, but cannot affect the operation of the picture or display change mechanism if the relay 85 is energized. This will be evident from Figure 1 which shows that the second movable contact of the relay 85 must be in its raised position in order to keep the circuit to the amplifier unit 79 closed when the switch 80 is against its lower fixed contact.

When the apparatus is operating automatically, with the relay 85 in its normal position, that is, with all of the movable contacts of the relay in their upward positions as shown in Figure 1, and the switch 80 in its downward position, electric impulses from the pickup device 78 cause repeated momentary closings of the switch in the amplifier unit 79 and each separate A signal thereby causes one operation of the solenoid 45 and clutch 41 to change from one picture to the next. For obtaining continuous operation of the projector 38 as a motion picture projector under control of the sound record 10, a long A signal is used to maintain the solenoid 45 energized for the period that the motion picture operation is to continue. The motors 12 and 43 are preferably constant speed motors and coordinated that the film cannot run ahead of the discourse on the record.

When the pickup device 87 responds to one of the B control signals on the record 10, and the electric impulse to the amplifier 88 causes the relay 85 to be energized and to pull down all of its movable contacts, the control of the picture change is shifted from the A signals to either the manual control switch 65 or the mechanically actuated switch 70 depending upon the position of the switch 68.

Means are provided for checking the synchronism of the film 40 and the record 10. When the solenoid is operated only by pulses of current synchronization can be checked by having a counter 91 geared to the shaft 42 in such a way as to count the number of times that the shaft moves to change from one picture to the next, and another counter 92 connected in parallel with the solenoid 45 and operated by electrical impulses to count the number of picture change impulses received by the solenoid 45. It will be evident that if the mechanism works properly, and the clutch 41 operates to change the picture every time an A signal, or one of the switches 65 or 70, supplies a pulse of current to energize the solenoid 45, the numbers indicated by the counters 91 and 92 will always be the same.

The counter 91 is mechanically reversible, and the electrically actuated counter 92 is connected with a reversing switch 94. This reversing switch 94 is connected to the other reversing switches 33 and 36 so that the counter 92 will operate in a reverse direction when the motor 43 is reversed to turn the clutch 41 backwards. If at any time the numbers recorded on the counters 91 and 92 are not the same, the shaft 42 is turned by a handwheel 93 secured to the shaft. This handwheel is turned in either a forward or reverse direction as may be necessary to bring the counter 91 up to or down to the number recorded on the signal counter 92. The handwheel 93 is, therefore, a master control for putting the film 40 and sound record 10 back into synchronism if they get out of correct timed relation with one another.

The master control for the motors 12 and 43 which drive the record 10 and clutch 41, respectively, comprises a push button switch 94 connected in parallel with the film actuated switch 60 and a relay 96. This relay 96 has contacts 97 that are open when the coil of the relay 96 is not energized, but which remain closed as long as the relay is energized through either the switch 94 or the switch 60. The contacts 97 are in series with the switch 36 that supplies power to the motors 12 and 43, and the circuits of both motors is open, therefore, unless the relay 96 is energized.

The conductors marked "X" at the lower right hand portion of Figure 1 connect with the conductors "X" leading to the motors 21, 52 and 73, and the conductors marked "Y" connect all of the amplifier units 29, 79, and 88 with the power line. With these connections all of the circuits of the apparatus can be connected with, or disconnected from, the power line by a single power line switch 99.

Figure 2 shows the construction of the clutch 41. This clutch has a driving element 100 secured to one end of a shaft 101 that turns in a bearing 102 in a pedestal support 103. A pulley 105 on the other end of the shaft 101 is connected with a pulley 106 of the motor 43 by a V belt 107.

The clutch has a driven element 110 connected to a sleeve 111 that turns in a bearing 112 in a stationary support 113. The clutch element 110 is slidable axially in the bearing 112 and is urged against an end face of the bearing 112 which serves as a thrust bearing surface for the driven element 110. A spring 115 compressed between the clutch elements 100 and 110 urges the clutch element 110 against the thrust bearing surface on the end face of the bearing 112.

The shaft 42 extends into the sleeve 111 and has a key 117 extending into a keyway in the sleeve 111 for making the shaft 42 rotate as a unit with the driven clutch element 110. This clutch element 110 has studs 119 extending into holes in the support 113. As long as the studs 119 are projecting into the holes in the stationary support, the clutch element 110 is held against rotation. The holes that receive the studs 119 are located at different distances from the axis of rotation of the clutch element 110 so that when the clutch element 110 is moved toward the right far enough to withdraw the studs 119 from the holes in the support 113 and to engage the driving clutch element 100, the driven clutch element 110 will make one complete revolution before the pins 119 come back into position to engage the holes from which they were displaced. The pins 119 are in effect locking elements to keep the clutch engaged until it has turned far enough to bring the next film frame into position for projection. In the apparatus illustrated, the shaft 42 is geared to the sprocket that moves the film with a gear reduction that causes one revolution of the shaft 42 to turn the sprocket just enough to bring the next film frame into position for projection.

The structure for moving the clutch element 110 into engagement with the driving clutch element 100 includes throw-out pins 121 extending from a disc 122 which is slidable axially along the shaft 42. A throw-out collar 124 on the shaft 42 has an annular groove engaged by a yoke at the lower end of a lever 125. This lever 125 is supported by a fulcrum stud 127 and is connected with the armature 128 of the solenoid 45 by a link 129.

Whenever the solenoid 45 is energized, it moves its armature 128 inward and transmits motion through the link 129 and lever 125 to the throw-out collar 124. This movement of the throw-out collar pushes the disc 122 toward the support 113 and causes the pins 121 to push the studs 119 out of the holes in the support 113 so that the clutch element 110 is moved into engagement with the driving clutch element 100.

If the solenoid 45 is energized continuously, the clutch elements 100 and 110 remain engaged and the shaft 42 is rotated continuously in its bearing 131 and keeps the intermittent motion device 39 in operation. For moving the film by only one frame, however, it is essential to have the power supplied to the solenoid 45 in pulses so that the solenoid 45 is de-energized before the clutch has made a complete revolution. This causes the clutch to be disengaged by the spring 115 after each revolution when the studs 119 come back into posiiton to register with the holes from which they are displaced by the throw-out pins 121.

When the current to the solenoid 45 is supplied from the amplifier that is responsive to the A control signals on the record, the current can be in pulses or for substantial periods to obtain the desired effect. Special apparatus has to be provided for obtaining either pulses of short duration or a continuous current supply when the solenoid 45 is under manual control through the switch 65.

Figure 3 shows the construction of the switch 65 in detail. This switch has two resilient contact arms 135 and 136 which are connected by conductors 137 and 138 with the double-pole, double-throw switch (68) used to connect and disconnect the switch 65 and the picture change control circuit that includes the solenoid 45.

The switch 65 has two push buttons, including a push button 140 at one end of a stem 141 that slides in bearings in a fixed support 142. A compression spring 144, connected at its upper end to the stem 141, bears against the lower portion of the support 142 and urges the stem 141 upward into the position shown in Figure 3. A pin 146 extending through the stem 141 below the fixed support 142 limits the upward movement of the stem. A pawl 150 is pivotally connected to the stem 141 by a stud 151, and this pawl 150 is urged into contact with a ratchet 152 by a spring 153.

The ratchet 152 is supported by an axle 155. A cam 156 on the same axle with the ratchet 152 is connected with the ratchet by means of a spring 158. In the construction shown, this spring 158 is attached to the back of the ratchet 152 by a connection 160, and the lower end of the spring 158 is secured to the cam 156 by an anchor 161. The cam 156 has four lobes corresponding with the four teeth of the ratchet 152. The cam 156 can be made with a different number of lobes, but if the number is changed, the construction of the ratchet must be modified accordingly.

A cam follower 163 is attached to the movable contact 136 and is held against the cam 156 by the resilient spring pressure of the movable contact. When the button 140 is depressed and causes the pawl 150 to turn the ratchet 152, the spring 158 winds part way around the axle 155 and increases in tension until it has sufficient force to turn the cam 156 against the spring pressure of the movable contact 136. This movement of the cam displaces the cam follower 163 and causes the movable contact 136 to move over far enough to touch the contact 135, thus closing the circuit through the switch 65.

Since the cam 156 is moved by tension in the spring 158, rather than by direct displacement of the button 140, the cam moves quickly for the full angular displacement of one lobe of the cam and thereby causes a momentary contact of the switch contacts 135 and 136 followed by a return of the follower 163 to a normal position between the next two lobes of the cam. This switch 65 is merely representative of manually actuated switches that maintain only momentary contact regardless of the length of time that the actuating element is depressed.

The switch 65 has a second push button 164 on the end of a shaft and normally held in a raised position by a spring, the construction being similar to that of the push button 140. This second push button 164 operates a crank 165 to displace the contact arm 135 and move it up against the other contact arm 136 to close the switch 65 and keep it closed as long as the button 164 is held depressed.

Figure 4 shows a portion of the film 40 on an enlarged scale. This film has control signals comprising notches 166 along the right hand edge of the film for actuating the switches 58 and 59 of Figure 1. The film 40 has one or more other control signals such as a notch 167 in the left hand edge of the film for actuating the switch 60 of Figure 1. This switch 60, and the control notch 167 which actuates it, is for the purpose of stopping the apparatus at the end of the film or at the end of a rewind, but similar notches can be provided at other places along the film if it is desirable to have all of the apparatus stop automatically and completely at some selected place during the showing of the film.

The film shown in Figure 4 has indicia, such as consecutive numerals, in the lower left hand corner of each frame, and these indicia are displayed on the screen for the purpose of checking the synchronism of the film and sound record. Corresponding indicia along the sound track are used to show whether the sound track is in proper timed relation with the film.

Figure 5 shows the sound track 10 with the picture change control signal indicated by the legend "Signal A" and the control signals for operating the main control relay and stopping the sound record indicated by the legend "Signal B". The numeral 3 located under signal A indicates that this picture change control signal should bring frame No. 3 of the film into position for projection. The use of these corresponding numerals on the film and sound record for indicating whether the film and sound record are in proper timed relation can be used instead of the counters 91 and 92 shown in Figure 1, or can be used in the same apparatus with the counters, if desired.

The record 10 shown in Figure 5 has the control signals A and B located along separate tracks parallel with the sound track. It will be understood, however, that the control signals A and B can be located along the same track and can have different characteristics, particularly different frequencies, so that each one will affect only the control circuit for which it is intended. It will be understood further that the control signals can be superimposed on the sound track if a very narrow record is to be used; and when the control signals are superimposed on the sound track it is merely necessary to make them with characteristics that do not affect the sound reproducing circuit. When the signals are located along the same track, one pick-up device is sufficient for the different signals, with filters for separating the signals for the different circuits that the signals are to control.

In the operation of the apparatus shown in Figure 1, the motors 12 and 43 are started originally by pressing the button of switch 94 which energizes the relay 96 and closes the motor circuits. This starts the sound record 10. The switch 94 is held in closed position manually until the first movement of the film 40 shifts the notch in the film beyond the feeler 62. The film then closes the switch 60 and it is no longer necessary to hold the switch 94 closed.

The picture sequence is started by the first control signal on the record 10 to which the pickup device 78 is responsive. With each additional impulse that affects the pickup device 78, the apparatus operates to change to the next picture. The controls that are responsive to the signals on the record may be considered as the "primary controls" of the apparatus; and the film operated switches 58 and 59 may be considered the "secondary controls."

At the conclusion of each sentence of the sound record, or at other logical pauses in the discourse on the sound track, there is a B signal to which the pickup device 87 is responsive, and such signals energize the relay 85 and cause it to pull down its movable contacts and stop the motor 12 that drives the sound record. This operation of the relay 85 shifts the control of the picture change from the sound record 10 to the manually operated switch 65 so that further changes in the pictures can be affected manually and at any desired rate until a point is reached where the discourse should again be synchronized with the picture. At such a point there is a control signal on the film 40 that causes the switch 59 to open and break the holding circuit of the relay 85 so that further control of the picture change is shifted back to the sound record 10. This release of the relay 85 causes the circuit of the motor 12 to be closed so that the sound track is again started.

If the signal on the film for operating the switch 59 is at a region where it opens this switch 59 at the same time that a B signal comes under the pickup device 87, the relay 85 will merely operate momentarily and drop back without stopping the motor 12 that moves the sound record.

During the time that the sound track is stopped and while the picture change is under manual control of the operator, the double pole, double throw switch 68, can be moved into its upward position to put the picture change under the control of the mechanically operated switch 70. When the picture change is being controlled by this switch 70, or by the switch 65, the picture sequence can travel only as far as the next synchronizing control signal of the film because such a signal opens the switch 59 and returns the control of the picture change to the sound record 10.

By operating the preselecter switch 80 it is possible for the operator to change pictures at any desired rate even during a period of sound reproduction from the record 10. The operator may extend the period of picture projection to occupy more time than that required for the discourse on the record, and the sound record will stop in accordance with the control signal for the pickup device 82 even though all of the pictures that accompany the discourse ahead of that signal have not yet been shown. The sound record will automatically start again, however, when the next control signal on the film actuates the switch 59, thus re-establishing the proper timed relation of the film and sound record. During parts of the record where it is important to have a particular picture displayed during a portion of the discourse, control signals for operating the switch 52 are provided at relatively close intervals so as to bring the film and sound record back into synchronism at any place where such synchronism is required.

It is not necessary for the operator to decide at the beginning for each discourse how the next picture sequence is to be projected. It is possible for him to return the preselector switch 80 to its normal downward position during the projection of the first picture of a synchronized sequence and have the remainder of the sequence projected under automatic control from the sound record.

In the event that the operator has the switch 80 in position to permit him to manually control the picture changes during a discourse from the sound record, and the operator changes pictures at a rate faster than the rate at which they would be changed automatically by the signals on the sound record, the last picture of a sequence may be projected before the conclusion of the discourse, and the operator may unintentionally attempt to change to the first picture that should accompany the next discourse on the sound record. This is prevented by the switch 58 which is opened by the control signal on the film and prevents the operator from making any further picture changes until the discourse on the sound record is completed and a control signal on the record has actuated the relay 85. When this relay 85 is energized it closes a circuit that restores the control of the picture change to the operator even though the switch 58 is open.

For rewinding any portion of the record 10 and film 40, as for example, where it is desirable that a portion of the discourse should be repeated, the control button 37 is actuated to move switches 33, 36 and 94 into position for reverse operation. This causes the motors 12 and 42, and the counter 92 to run backwards, and opens the sound circuit so that the speaker 31 does not operate during reverse movement of the sound record. When rewinding the film and sound record back to their starting position, a control signal is provided on the film 40 in position to open the switch 60 and cooperate with a stop signal on the sound record to stop the film and sound record in position to be again operated in a forward direction with proper synchronization assured.

If the number of picture change control signals on the record is equal to the number of pictures in each sequence on the film, the timed relation of the film and sound record is maintained during rewinding. When there are more picture changes on the film than there are picture change control signals on the record, it is necessary during the rewinding operation to use the cam operated switch 70 for returning all of the pictures to the beginning of a sequence before the next sequence can be rewound. This is taken care of automatically during the rewinding if the switch 68 is in position to connect the cam operated switch 70 with the circuit of the solenoid 45.

Some features of the invention can be obtained even though the sound record is not separate from the film. For example, with the sound record on the film, a control signal can stop the film and throw the control to the manually operated switch 65 or the mechanically operated switch 70, until a control notch on the film operates the switch 59 to again start the film running.

The preferred method and apparatus of this invention have been described, but changes and modifications can be made and features of the invention can be used in various combinations without departing from the invention as defined in the claims.

We claim as our invention:

1. The method of coordinating recorded sound with the successive exhibition of displays in a sequence, which method comprises reproducing the sound from a moving record, controlling the change from the exhibition of one display to the next by signals located on the sound record, stopping the sound record at periods when no sound is to accompany the exhibition of a display, and controlling the restarting of the sound record by signals on the displays.

2. The method of coordinating recorded sound with the successive exhibition of displays, as described in claim 1, and in which the change from the exhibition of one display to the next is controlled part of the time manually and independently of the signals on the record while the record is running, and in which the change from the exhibition of one display to the next is made in accordance with a predetermined time sequence when the record is stopped.

3. The method of coordinating recorded sound with the successive exhibition of displays, as described in claim 1, characterized by the changing from the exhibition of one display to the next in accordance with a predetermined time sequence when the record is stopped.

4. The method of operating a display exhibiting apparatus in timed relation with the reproduction of sound from a sound track on a record that is separate from the displays, which method comprises operating the sound record and changing from one display to another in a predetermined sequence in accordance with control signals on the record, reversing both the direction of operation of the sound record and the order of sequence of the display exhibitions at selected intervals, stopping the reproduction of sound while operating in a reverse direction, and during reverse movement of the record and the display sequence, maintaining the synchronism of the record and display sequence for subsequent forward operation.

5. In the exhibition of a sequence of displays in timed relation with the reproduction of recorded sound, the improvement that comprises changing from the exhibition of one display to the next in accordance with a control signal on the same record with the sound, stopping the sound record in accordance with another control signal on the sound record, changing from one display to a successive display while the record is stopped, and restarting the record in accordance with a control signal on the display sequence.

6. The method of reproducing recorded sound in timed relation with the exhibition of a sequence of displays, which method comprises changing from one display to the next in accordance with a control signal on the record with the sound, stopping the record at intermediate regions of the record in accordance with other control signals on the record, reversing both the movement of the record and the order of exhibition of the displays for a period to obtain a repeat of the sound and accompanying display exhibition, and maintaining the record and display sequence in timed relation by changing the exhibition of displays in accordance with a control signal on the record when the record is running backward as well as forward.

7. The method of operating a sound record in timed relation with apparatus for exhibiting a number of displays in a sequence, which method comprises controlling the operation of the exhibiting apparatus for a part of the sequence in accordance with control signals on the sound record, controlling the operation of the sound record during part of the sequence in accordance with control signals on the display sequence, and shifting from control by the signals on the record to control by the signals on the display sequence in accordance with control relinquishing signals on the record and displays.

8. The method of synchronizing the exhibition of images from a film, shown by a projector, with sound signals from a periodically moved sound record, which method comprises controlling the projector in accordance with signals on the sound record when said record is moving, controlling the restarting of the record in accordance with signals on the film, and shifting the control of the synchronism from the record to the film and vice versa in accordance with signals on the record and film respectively.

9. In the operation of a display device that has mechanism for moving successive displays into position for exhibition in response to control signals on the same record with sound signals that are intended to accompany the display sequence, the method comprising manipulating the sound record to stop, reverse, and repeat in accordance with the desires of the audience, and maintaining the timed relation of the sound and display sequence by controlling the change of displays in accordance with the control signals on the record during said manipulating of the sound record and regardless of the direction of movement of the sound record.

FRED WALLER.
WILLIS ROBERT DRESSER.

REFERENCES CITED

The following references are of record in the file of this patent:

UNITED STATES PATENTS

| Number | Name | Date |
|---|---|---|
| 1,311,433 | Andrews | July 29, 1919 |
| 1,523,173 | Clark | Jan. 13, 1927 |
| 1,909,765 | Jenkins et al. | May 16, 1933 |
| 2,116,314 | Jenkins et al. | May 3, 1938 |